US011971671B2

(12) United States Patent
Lee et al.

(10) Patent No.: US 11,971,671 B2
(45) Date of Patent: Apr. 30, 2024

(54) SLIDING LAYER FOR REDUCING FRICTION BETWEEN FUSING BELT AND PRESSING MEMBER THEREOF

(71) Applicant: HEWLETT-PACKARD DEVELOPMENT COMPANY, L.P., Spring, TX (US)

(72) Inventors: Sun Hyung Lee, Seongnam-si (KR); Sea Chul Bae, Seongnam-si (KR); Jae Hyeok Jang, Seongnam-si (KR); Jin Gyu Ko, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/788,015

(22) PCT Filed: Dec. 28, 2020

(86) PCT No.: PCT/US2020/067166
§ 371 (c)(1),
(2) Date: Jun. 22, 2022

(87) PCT Pub. No.: WO2021/141790
PCT Pub. Date: Jul. 15, 2021

(65) Prior Publication Data

US 2023/0048699 A1 Feb. 16, 2023

(30) Foreign Application Priority Data

Jan. 6, 2020 (KR) ........................ 10-2020-0001621

(51) Int. Cl.
*G03G 15/20* (2006.01)

(52) U.S. Cl.
CPC ..... *G03G 15/2028* (2013.01); *G03G 15/2032* (2013.01); *G03G 2215/2009* (2013.01)

(58) Field of Classification Search
CPC ................... G03G 2215/2009; G03G 15/2032
See application file for complete search history.

(56) References Cited

U.S. PATENT DOCUMENTS

2003/0169323 A1 9/2003 Fukuda et al.
2005/0084690 A1* 4/2005 Matsunaka ............ B29D 22/00 428/447

(Continued)

FOREIGN PATENT DOCUMENTS

JP 2516886 B2 7/1996
JP 2002148970 A * 5/2002

(Continued)

OTHER PUBLICATIONS

KR_950013027_B1_I Machine Translation, Kusaka et all., Korea, Oct. 1995.*

(Continued)

*Primary Examiner* — Victor Verbitsky
(74) *Attorney, Agent, or Firm* — Foley & Lardner LLP

(57) ABSTRACT

A fusing apparatus includes: a pressing roller to be axially rotated; a fusing belt to rotate by receiving a rotational force from the pressing roller; a pressing member to press toward the pressing roller from the inside of the fusing belt to form a nip in which the printing paper is nipped between the fusing belt and the pressing roller; on the fusing belt or the pressing member, a sliding layer to reduce friction between the fusing belt and the pressing member; and an adhesive layer to adhere the sliding layer to the fusing belt or the pressing member.

16 Claims, 8 Drawing Sheets

(56) References Cited

U.S. PATENT DOCUMENTS

| | | | |
|---|---|---|---|
| 2010/0055365 | A1 | 3/2010 | Nakajima et al. |
| 2010/0129580 | A1 | 5/2010 | Sandaiji et al. |
| 2011/0229180 | A1 | 9/2011 | Saito |
| 2012/0275731 | A1 | 11/2012 | Ziegler et al. |
| 2014/0127513 | A1 | 5/2014 | Nakajima et al. |

FOREIGN PATENT DOCUMENTS

| | | | | | |
|---|---|---|---|---|---|
| JP | 2003-257592 | A | | 9/2003 | |
| JP | 2014222339 | A | * | 11/2014 | ......... G03G 15/2028 |
| KR | 950013027 | B1 | * | 10/1995 | |

OTHER PUBLICATIONS

JP_2003257592_A_I MachineTranslation, Saotome et all., Japan, Sep. 2003.*
JP_2002148970_A_t Machine Translation, Japan, 2002, Komatsu.*
JP_2014222339_A_t Machine Translation, Japan, 2014, Okabayashi.*

* cited by examiner

SLIDING LAYER FOR REDUCING FRICTION BETWEEN FUSING BELT AND PRESSING MEMBER THEREOF

BACKGROUND

An image forming apparatus refers to an apparatus for printing print data generated by a print control terminal device such as a computer onto a printing paper. Examples of such an image forming apparatus may include a copy machine, a printer, a facsimile, or a multi-function peripheral (MFP) that complexly implements the functions of the copy machine, the printer, and the facsimile through a single device.

DETAILED DESCRIPTION

Hereinafter, diverse examples will be described in detail with reference to the accompanying drawings. The examples described below may be modified and implemented in various different forms. In order to more clearly describe the features of the examples, a detailed description of known matters to those skilled in the art to which the examples below pertain will be omitted.

Meanwhile, as used herein, when any one component is referred to as being “connected to” another component, it means that any one component and another component are ‘directly connected to’ each other or are ‘connected to each other while having the other component interposed therebetween’. In addition, when any one component is referred to as “comprising” or “including” another component, it means that other components are not excluded but may be further included, unless explicitly described to the contrary.

In the specification, an “image forming apparatus” may refer to an apparatus for printing print data generated by a terminal device such as a computer onto a recording paper. Examples of such an image formation apparatus may include a copy machine, a printer, a facsimile, or a multi-function peripheral (MFP) that complexly implements the functions of the copy machine, the printer, and the facsimile through a single device.

The image forming apparatus may include a developing apparatus, a transfer apparatus, and a fusing apparatus. The developing apparatus is a component for forming an image on a printing paper. The developing apparatus forms the image by supplying a developer, that is, a toner, to a photosensitive member on which an electrostatic latent image is formed. The transfer apparatus transfers the image formed on the photosensitive member to the printing paper. The image transferred to the printing paper may be fused to the printing paper while passing through the fusing apparatus.

There are several types of fusing apparatuses including, for examples, a fusing apparatus of a heating roller type and a fusing apparatus of a fusing belt type. Hereinafter, various examples of the fusing apparatus will be described.

Figure 1:
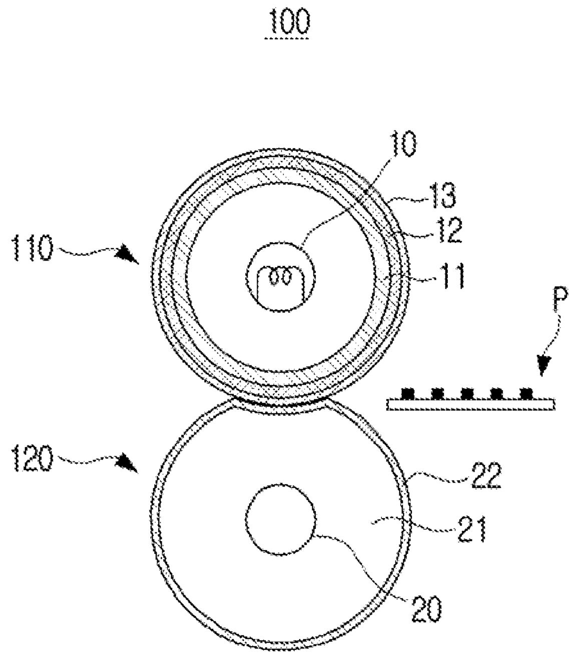
FIG. 1 is a view illustrating a cross section of an example of a fusing apparatus of a heating roller type.

FIG. 1 is a view illustrating a cross section of an example of a fusing apparatus of a heating roller type.

Referring to FIG. 1, a fusing apparatus 100 may include a heating roller 110 having a heating source therein and a pressing roller 120 in pressure contact with the heating roller 110 to form a nip.

The heating roller 110 may include a heating source 10 and a release layer 13 disposed on an outer surface of a cylindrical substrate 11. An elastic layer 12 having strong heat resistance may be further disposed between the substrate 11 and the release layer 13. It is also possible to form only the release layer 13 without the elastic layer 12 having heat resistance.

The substrate 11 may be formed of an aluminum metal core, and the heating source 10 may be disposed in a hollow of the aluminum metal core. The heating source 10 may be disposed at about the same position as a rotation axis of the heating roller 110. As the heating source 10, a halogen lamp or the like may be used, and the heating roller 110 may be heated by heat from the heating source 103.

The pressing roller 120 may include a heat resistant elastic layer 21 and a release layer 22 such as a heat resistant resin film or a heat resistant rubber film on an outer surface of the metal core 20.

When either the heating roller 110 or the pressing roller 120 is driven to rotate, the other roller also rotates by such a driving. The rotation of the two rollers makes it possible to transfer printing paper P, and also makes it possible to simultaneously transfer heating and pressurization to the printing paper P.

An unfused image in the printing paper P is softened by the heat of the heating roller 110 by introducing the printing paper P into the nip formed by the heating roller in pressure contact with the pressing roller 120, and is pressured by pressure contact between the pressing roller 120 and the heating roller 110, thereby making it possible to be fused to the printing paper.

In the fusing apparatus 100 of the heating roller type, the heating roller 110 usually uses a hollow aluminum pipe of 0.6 t or more as the substrate 11. However, because the aluminum pipe has a large heat capacity, the aluminum pipe takes a long time to heat up to a temperature necessary for fusing the image on the printing paper P, and thus, quick-heating is impossible. Therefore, there is a heat loss problem caused by the heating roller 110 itself needing to be heated, and a low efficiency problem due to the large heat capacity of the aluminum pipe.

To solve such problems, a fusing apparatus of a fusing belt type has been proposed. In the fusing belt type, heat loss may be reduced by heating a belt having a small heat capacity instead of heating the heating roller.

Figure 2:
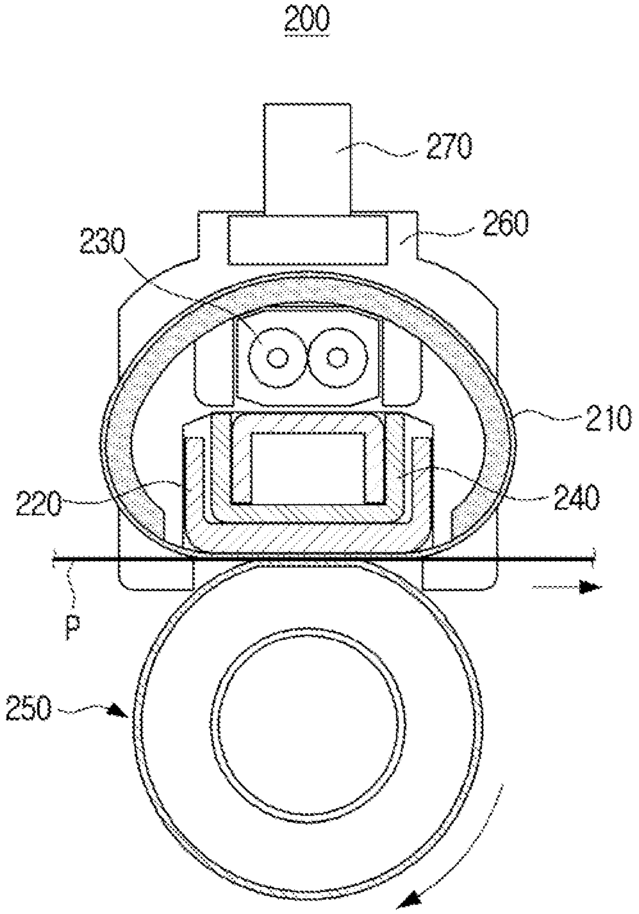
FIG. 2 is a view illustrating a cross section of an example of a fusing apparatus of a fusing belt type.

FIG. 2 is a view illustrating a cross section of an example of a fusing apparatus of a fusing belt type.

Referring to FIG, 2, a fusing apparatus 200 may include a fusing belt 210, a pressing member 220 disposed in the fusing belt 210, a metal bracket 240 for pressing the fusing belt 210 and a heater 230, a pressing roller 250, and a temperature sensor 260 and a thermostat 270 for blocking a power supply. Depending on the example, some of the components may be omitted, and although not shown, additional components may be further included in the fusing apparatus 200.

The pressing member 220 is a component disposed inside the fusing belt 210 to contact the fusing belt 210. The pressing member 220 presses the fusing belt 210 toward the pressing roller 250.

The pressing member 220 may be any structure which may press the fusing belt 210 therein. However, according to an example, as illustrated in FIG. 2, the pressing member 220 may be a structure in which the pressurization is substantially applied to the metal bracket 240 and the pressure member 220 presses the fusing belt 210 toward the pressing roller 250 by the metal bracket 240.

A nip is formed in which the printing paper P is engaged by mutual pressurization between the pressing member 220 and the pressing roller 250 with the fusing belt 210 interposed therebetween. A width of the nip in the fusing belt type, which forms the nip as described above, is wider and flatter than the width of the nip formed in the heating roller type.

The pressing roller 250 axially rotates, and the fusing belt 210 may rotate by receiving a rotational force from the pressing roller 250, thereby moving the printing paper P.

The heater 230 may be located at the center of rotation of the fusing belt 210. As the heater 230, a halogen lamp, for example, or the like may be used. The fusing belt 210 is heated by radiant heat from the heater 230. An unfused image in the printing paper P is softened in the nip by conduction of heat from the fusing belt 210, and is pressed by the pressure contact between the fusing belt 210 and the pressing roller 250, thereby making it possible to be fused to the printing paper P.

The temperature sensor 260 is a component to detect the temperature of the heater 230. When the temperature of the heater 230 is lowered to a fusible range or less, power may be supplied to the heater 230 to raise the temperature of the heater 230 to the fusible range. The thermostat 270 may block the power supply to the heater 230 according to a state of the fusing belt 210. The thermostat 270 has a bimetal, and the power supply to the heater 230 may be blocked when a temperature of the bimetal is a threshold value or more.

Figure 3:
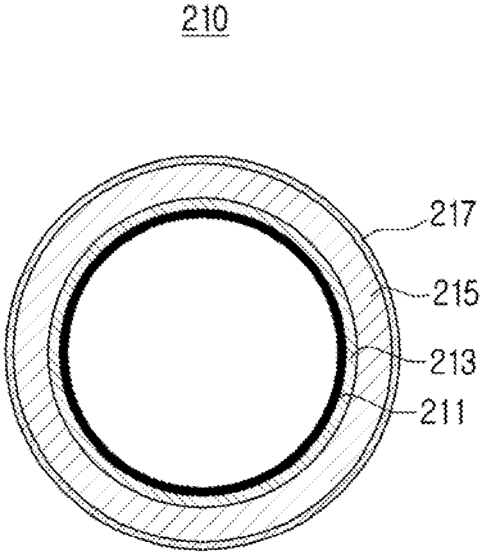
FIG. 3 illustrates a cross-sectional view of an example of a fusing belt that may be used in the fusing apparatus of the fusing belt type.

FIG. 3 illustrates a cross-sectional view of an example of the fusing belt 210 that may be used in the fusing device of the fusing belt type as described above.

Referring to FIGS. 2 and 3, the fusing belt 210 may be an endless belt having a cylindrical shape. The fusing belt 210 may include a blackened layer 211 inside thereof to facilitate heating by the radiant heat from the heater 230. The blackened layer 211 may be formed by oxidizing a substrate layer 213. For example, the blackened layer 211 may be $Fe_4O_3$.

As illustrated in FIG. 3, the fusing belt 210 may include the substrate layer 213 and a release layer 217 and, to improve an image quality of a printed matter, an elastic layer 215 may be disposed between the substrate layer 213 and the release layer 217 to form a relatively wide and flat nip.

The substrate layer 213 may be formed of a heat resistant resin such as polyimide (PI), polyimide (PA), or polyamideimide (PAI), or a metal such as stainless steel (SUS) or nickel (Ni), and may have a thickness of 30 to 200 μm, or for example 50 to 100 μm.

The release layer 217 coated on the substrate layer 213 may be a fluorine resin, for example, perfluoroalkoxy fluorine resin (PFA), polytetrafluoroethylene (PTFE), a copolymer of tetrafluoroethylene and hexafluoroethylene (fluorinated ethylene propylene (FEP)), and the like, and may have a thickness of 10 to 30 μm.

The elastic layer 215 may be formed of various rubber materials such as fluorine rubber, silicone rubber, natural rubber, isoprene rubber, butadiene rubber, nitrite rubber, chloroprene rubber, butyl rubber, acryl rubber, hydrin rubber, and urethane rubber, elastic materials such as various thermoplastic elastomers such as styrene-based, polyolefin-based, polyvinyl chloride-based, polyurethane-based, polyester-based, polyamide-based, polybutadiene-based, polyisoprene-based, and chlorinated polyethylene-based elastomers, or a combination thereof. A thickness of the elastic layer 215 is for example set to 100 to 300 μm in consideration of heat transfer to the printing paper.

Figure 4:
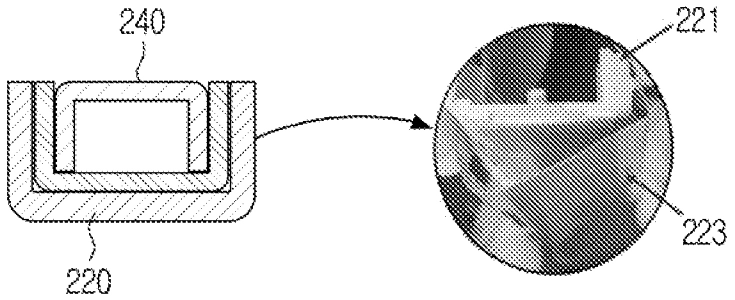
FIG. 4 is a view for describing components of a fusing apparatus of a fusing belt type according to an example.

FIG. 4 describes components disposed in the fusing belt 210 in more detail. Referring to FIG. 4 together with FIG. 2, the left side of FIG. 4 is a schematic view of the pressing member 220 and the metal bracket 240 disposed in the fusing belt 210 and the right of FIG. 4 shows the pressing member 220 according to one example.

Referring to FIG. 4, the pressing member 220 may include an inner holder 221 and a plate-nip 223. The plate-nip 223 comes into contact with an inner surface of the fusing belt 210.

The inner holder 221 may be made of a heat resistant resin such as liquid crystal polymer (LCP), polyetheretherketone (PEEK), polyphenylene sulfide (PPS), or the like. The plate-nip 223 may be made of metal such as SUS or aluminum, and may have a thickness of 0.1 to 0.5 t.

In the example illustrated in FIG. 4, the pressing member 220 is illustrated as including two members of the inner holder 221 and the plate-nip 223, but may also be formed of one member.

In the fusing apparatus of the fusing belt type, because the pressing member and the inside of the fusing belt rotate in contact with each other, abrasion occurs between the two members, which may cause problems in life and performance.

Figure 5:
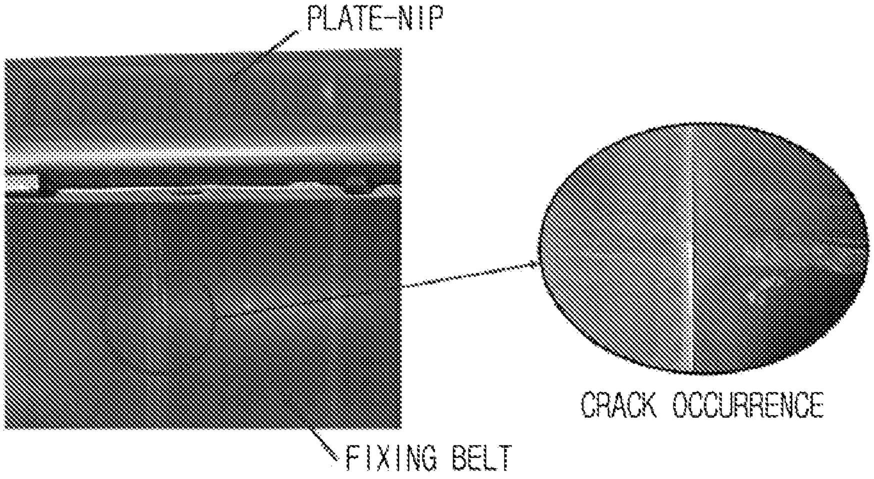
FIG. 5 is an image illustrating scratch type abrasion on an inner surface of the fusing belt that may be caused in the fusing apparatus of the fusing belt type according to an example.

As an example, scratch type abrasion may occur linearly on the inner surface of the pressing member and the fusing belt by friction between the pressing member and the blackened layer in the fusing belt (see FIG. 5), which causes cracks in the fusing belt due to continued use, which eventually causes the fusing belt to break.

On the other hand, in order to minimize the frictional force during the rotation of the pressing member and the fusing belt, it is possible to form a coating layer for improving slidability and to apply a lubricant to the pressing member. However, the friction between the pressing member and the blackened layer in the fusing belt causes the scratch type abrasion on the fusing belt and the coating surface of the pressing member, dust caused by such abrasion deteriorates the performance of the lubricant and as a result, continued use results in a problem of increasing a drive torque of the fusing apparatus. In particular, radiation deviation occurs at a portion of the blackened layer on the inner surface of the fusing belt where the scratch type abrasion occurs, which causes a temperature deviation in the fusing belt, which causes the gloss deviation in the image.

Therefore, in the fusing apparatus of the fusing belt type, it is important to minimize abrasion between the pressing member and the inner surface of the fusing belt.

According to an example, the coating layer for reducing the frictional force may be formed on the inner surface of the fusing belt and/or the surface of the pressing member. Such a coating layer may be referred to as a sliding layer. Exemplary structures of the fusing belt and the pressing member in which the sliding layer is formed is illustrated in FIGS. 6A and 6B.

Figure 6A:
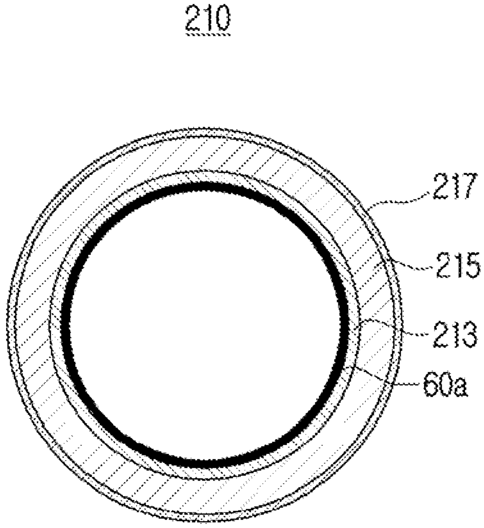
FIGS. 6A and 6B are views for describing a fusing belt and a pressing member according to an example, to which a sliding layer is coated without an adhesive layer.
Figure 6B:
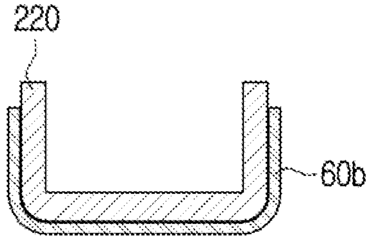

FIG. 6A illustrates a fusing belt 210 according to another example and FIG. 6B illustrates a pressing member 220 according to another example.

Referring to FIG. SA, the fusing belt 210 may include the substrate layer 213 and the release layer 217, and the elastic layer 215 may be disposed between the substrate layer 213 and the release layer 217. The substrate layer 213, the elastic layer 215, and the release layer 217 have been described above with reference to FIG. 3, and repeated descriptions thereof will be thus omitted.

In particular, the fusing belt 210 according to the example may have a sliding layer 60*a* formed on the inner surface thereof. The sliding layer 60*a* functions to reduce friction with the pressing member 220.

Referring to FIG. 6B, a sliding layer 60*b* for reducing friction with the fusing belt 210 may be formed on the surface of the pressing member 220 which is in contact with the fusing belt 210. The pressing member 220 of FIG. 6B may include the inner holder and the plate-nip as described in FIG. 4, and the sliding layer 60*b* may be formed on the plate-nip.

The sliding layers 60*a* and 60*b* may be formed by using an adhesive property when a polyimide (or polyamideimide) is formed through an imidization reaction. For example, the sliding layers 60*a* and 60*b* may be formed by preparing a coating solution by dispersing lubricating-resistant organic particles in a polyamic acid solution, which is a precursor of polyimide (or polyamideimide), applying the coating solution onto the surface to be coated, and performing heat treatment to cause the imidization reaction. In this case, because an adhesive layer is not required, the sliding layers 60*a* and 60*b* may be thinly formed. The sliding layers 60*a* and 60*b* may have a thickness of 10 to 50 μm. Here, the lubricating-resistant organic particles may include at least one of perfluoroalkoxy fluorine resin (PFA) particles, polyetheretherketone (PEEK) particles, or carbon particles.

In addition, the sliding layers 60*a* and 60*b* may have the thickness of 1 to 50 μm, and the sliding layers 60*a* and 60*b* are black and may serve as a blackened layer that absorbs the radiant heat from the heater 230.

In the example described with reference to FIGS. 6A and 6B, the sliding layers may be formed on both the fusing belt 210 and the pressing member 220, and may also be formed only on any one of the fusing belt 210 and the pressing member 220.

Figure 7A:
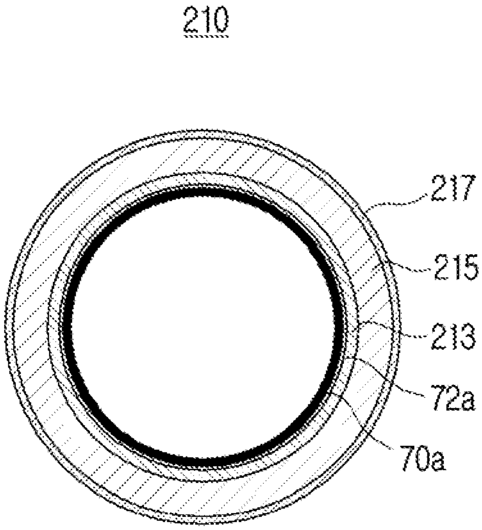
FIGS. 7A and 7B are views for describing a fusing belt and a pressing member according to another example, to which a sliding layer is coated through an adhesive layer.
Figure 7B:
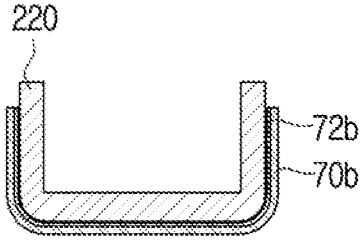

FIGS. 7A and 7B are views for describing a fusing belt 210 and a pressing member 220 according to still another example.

The example differs from the example described with reference to FIGS. 6A and 6B in that sliding layers 70*a* and 70*b* are bonded by adhesive layers 72*a* and 72*b*, and differs from the example described with reference to FIGS. 6A and 6B in that a polyimide component is not included in the sliding layers 70*a* and 70*b* as will be described in more detail below.

For example, referring to FIG. 7A, the fusing belt 210 according to the example may include the substrate layer 213 and the release layer 217, and the elastic layer 215 may be disposed between the substrate layer 213 and the release layer 217. The substrate layer 213, the elastic layer 215, and the release layer 217 have been described above with reference to FIG. 3, and repeated descriptions thereof will be thus omitted.

In addition, an adhesive layer 72*a* may be formed on an inner surface of the substrate layer 213, and a sliding layer 70*a* may be formed thereon. According to an example, a blackened layer (not illustrated) may be coated on the inner surface of the substrate layer 213, an adhesive layer 72*a* may be formed on the blackened layer, and the sliding layer 70*a* may be formed on the adhesive layer 72*a*. The blackened layer may be formed by oxidizing the substrate layer 213, for example, the blackened layer may be $Fe_4O_3$. According to another example, the blackened layer may be omitted. That is, the adhesive layer 72*a* may be formed on the inner surface of the substrate layer 213, and the sliding layer 70*a* may be formed thereon.

Referring to FIG. 7B, an adhesive layer 72*b* may be formed on a surface of the pressing member 220 which is in contact with the fusing belt 210, and a sliding layer 70*b* may be formed thereon. The pressing member 220 of FIG, 7B may include the inner holder and the plate-nip as described in FIG. 4, and the adhesive layer 72*b* and the sliding layer 70*b* may be formed on the plate-nip.

The adhesive layers 72*a* and 72*b* are components for bonding the sliding layers 70*a* and 70*b* to an adhesive surface and any material having suitable adhesion may be used.

The adhesive layers 72*a* and 72*b* may have a thickness of 1 to 20 μm.

According to the example, the sliding layers 70*a* and 70*b* are layers for reducing friction between the fusing belt 210 and the pressing member 220, and may be formed by spraying abrasion resistant resin particles on the adhesive layers 72*a* and 72*b* and then performing heat treatment. For example, when a solution prepared by dispersing the abrasion resistant resin particles in water or an organic solvent is applied to the adhesive layers 72*a* and 72*b* by spray coating and heat treated, the solvent may be evaporated and the abrasion resistant particles may be melted and clogged with each other to form the sliding layers 70*a* and 70*b*.

Here, the abrasion resistant resin particles may be formed of polyetheretherketone (PEEK).

According to another example, the abrasion resistant resin particles may be formed of polyetheretherketone (PEEK) and perfluoroalkoxy fluorine resin (PFA), or may be formed of polyetheretherketone (PEEK) and polytetrafluoroethylene (PTFE).

In the sliding layers 70*a* and 70*b*, the content of perfluoroalkoxy fluorine resin (PFA) or polytetrafluoroethylene (PTFE) may be 0 to 50 wt %. If the content of perfluoroalkoxy fluorine resin (PFA) or polytetrafluoroethylene (PTFE) is too high, the sliding layers 70*a* and 70*b* are easily worn, and thus the content thereof is for example 0 to 50 wt %.

The sliding layers 70*a* and 70*b* may have a thickness of 1 to 50 μm. The thicker the thickness between 1 to 50 μm, the better. However, a thickness above 50 μm may be disadvantageous in terms of fusibility and thermal efficiency.

In addition, the sliding layers 70*a* and 70*b* are black and may serve as a blackened layer that absorbs the radiant heat from the heater 230.

The adhesive layers and the sliding layers may also be formed on both the fusing belt 210 and the pressing member 220, and may also be formed only on any one of the fusing belt 210 and the pressing member 220. When the adhesive layers and the sliding layers are formed on both the fusing belt 210 and the pressing member 220, the sliding layer formed on the pressing member 220 and the sliding layer formed on the inner surface of the fusing belt 210 may be formed of the same material as each other. Alternatively, the sliding layers may also be formed of different materials.

Compared with the example described with reference to FIG. 6, in the example described with reference to FIG. 7, adhesion is stronger because the sliding layers are adhered using an adhesive layer instead of polyimide, and the frictional force between the fusing belt and the pressing member may be further reduced because the abrasion resistant resin particles such as PEEK, PFA, PTFE, and the like which are more slidable than polyimide, are included in the sliding layer at a higher ratio.

As in the above-described examples, by disposing the sliding layer on the surface in which the fusing belt and the pressing member contact each other, the frictional force may be minimized when the fusing belt rotates, and by minimizing the amount of abrasion of the fusing belt and the pressing member, the deterioration in performance of the lubricant may be reduced. Accordingly, by preventing an increase in the rotational torque and the occurrence of cracks, the long life of the fusing apparatus of the fusing belt type may be realized, and it is possible to prevent image defects caused by the temperature deviation caused by the abrasion inside the fusing belt.

Tables 1 to 4 show the results of evaluating the performance of a fusing belt of various structures fabricated to evaluate the frictional force. Tables 1 and 2 show the cases where there is a lubricant, and Tables 3 and 4 show the results when there is no lubricant.

For example, Table 1 shows the results of measuring friction coefficients in a circumferential direction of a fusing belt having a blackened layer on an inner surface thereof and a fusing belt coated with a sliding layer without an adhesive on an inner surface thereof. In the fusing belt having the blackened layer, a blackened layer having a size of 10 μm or more of a blackened crystal size present in the blackened layer was classified into a large crystal size, a blackened layer in which the blackened crystal size is distributed by 1 to 10 μm was classified into a middle crystal size, a blackened layer having a size of 1 μm or less of a blackened crystal size was classified into a small crystal size. The fusing belt coated with the sliding layer on the inner surface thereof is obtained as follows: Preparing a solution by dispersing polyetheretherketone (PEEK) particles and perfluoroalkoxy fluorine resin (PFA) particles in a polyimide (PI) precursor solution; applying the prepared solution on the surface to be coated; and performing heat treatment. The sliding layer is coated on the inner surface of the fusing belt by the adhesive force of the polyimide as it is formed by the heat treatment. The obtained sample is represented by PI+PEEK+PFA.

Table 2 shows the results of measuring friction coefficients in a length direction of the fusing belt having the blackened layer on the inner surface thereof and the fusing belt coated with the sliding layer on the inner surface thereof in the same manner as Table 1.

In Tables 1 and 2, the counterpart for measuring the friction coefficient is SUS coated by applying a dispersion of perfluoroalkoxy fluorine resin (PFA) particles in the polyimide precursor solution as a coating solution and performing heat treatment. Tables 1 and 2 show the results of applying the lubricant and measuring the friction coefficient when measuring the friction coefficient between the counterpart and the inner surface of the fusing belt.

As may be seen from Tables 1 and 2, the friction coefficients of the inner surface of the fusing belt in the circumferential direction and the length direction are affected by the blackened crystal size of the blackened layer. In addition, the smaller the blackened crystal size, the lower the friction coefficient. If the size is smaller, surface roughness is lowered, so that a film of the lubricant is uniformly formed, and thus the friction coefficient is lowered. On the other hand, it may be seen that the friction coefficient of the fusing belt coated on the inner surface with the PI+PEEK+PFA sliding layer is the lowest, and this is determined to be due to the fact that because the blackened crystal is usually $Fe_4O_3$, the friction coefficient of organic material is low and roughness is low compared with a metal oxide, and thus a lubrication effect of the lubricant is high.

TABLE 1

| Sample | Maximum Load (Kgf) | Minimum Load (Kgf) | Average Load (Kgf) | Maximum Friction Coefficient | Minimum Friction coefficient | Average Friction coefficient |
|---|---|---|---|---|---|---|
| Blackened Crystal Size Large | 1.71 | 1.43 | 1.53 | 0.34 | 0.29 | 0.30 |
| Blackened Crystal Size Middle | 1.08 | 0.99 | 1.04 | 0.22 | 0.20 | 0.21 |
| Blackened Crystal Size Small | 0.97 | 0.82 | 0.88 | 0.19 | 0.16 | 0.18 |
| Sliding Layer (PI + PEEK + PFA) | 0.58 | 0.48 | 0.53 | 0.12 | 0.10 | 0.11 |

TABLE 2

| Sample | Maximum Load (Kgf) | Minimum Load (Kgf) | Average Load (Kgf) | Maximum Friction Coefficient | Minimum Friction coefficient | Average Friction coefficient |
|---|---|---|---|---|---|---|
| Blackened Crystal Size Large | 1.77 | 1.50 | 1.58 | 0.35 | 0.30 | 0.31 |
| Blackened Crystal Size Middle | 1.18 | 1.09 | 1.14 | 0.24 | 0.22 | 0.23 |
| Blackened Crystal Size Small | 1.00 | 0.81 | 0.88 | 0.20 | 0.16 | 0.18 |
| Sliding Layer (PI + PEEK + PFA) | 0.64 | 0.54 | 0.59 | 0.13 | 0.11 | 0.12 |

Table 3 shows the results of measuring friction coefficients in a circumferential direction of a fusing belt having a blackened layer on an inner surface thereof and a fusing belt coated with a sliding layer without an adhesive on an inner surface thereof. In the fusing belt having the blackened layer, a blackened layer having a size of 10 μm or more of a blackened crystal size present in the blackened layer was classified into a large crystal size, a blackened layer in which the blackened crystal size is distributed by 1 to 10 μm was classified into a middle crystal size, a blackened layer having a size of 1 μm or less of a blackened crystal size was classified into a small crystal size. The fusing belt coated with the sliding layer on the inner surface thereof is obtained as follows: Preparing a solution by dispersing polyetheretherketone (PEEK) particles and perfluoroalkoxy fluorine resin (PFA) particles in a polyimide (PI) precursor solution; applying the prepared solution on the surface to be coated; and performing heat treatment. The sliding layer is coated on the inner surface of the fusing belt by the adhesive force of the polyimide as it is formed by the heat treatment. The obtained sample is represented by PI+PEEK+PFA.

Table 4 shows the results of measuring friction coefficients in a length direction of the fusing belt having the blackened layer on the inner surface thereof and the fusing belt coated with the sliding layer on the inner surface thereof in the same manner as Table 3.

In Tables 3 and 4, the counterpart for measuring the friction coefficient is SUS coated by heat treatment with a dispersion of perfluoroalkoxy fluorine resin (PEA) particles in the polyimide precursor solution as a coating solution. Tables 3 and 4 show the results of measuring the friction coefficient without applying the lubricant when measuring the friction coefficient between the counterpart and the inner surface of the fusing belt.

As may be seen from Tables 3 and 4, the friction coefficients of the inner surface of the fusing belt in the circumferential direction and the length direction are affected by the blackened crystal size of the blackened layer. In addition, the larger the blackened crystal size, the lower the friction coefficient. If the size is larger, surface roughness is higher, so that a contact area with the counterpart is smaller, and thus the friction coefficient is lowered. On the other hand, it may be seen that the friction coefficient of the fusing belt coated on the inner surface with the organic material is the lowest, and this is determined to be due to the fact that because the blackened crystal is usually $Fe_4O_3$, the friction coefficient of organic material is low compared with a metal oxide.

As may be seen from the measurement results of the friction coefficients of Tables 1 to 4, the friction coefficient is low regardless of the presence or absence of the lubricant in the case in which the sliding layer is present on the inner surface of the fusing belt than the blackened layer. In addition, it may be seen that the characteristic changes according to the presence or absence of the lubricant and the difference in the size of the blackened crystal in the fusing belt having the blackened layer present on the inner surface thereof. In the fusing apparatus of the fusing belt type, the lubricant is usually applied between the inner surface of the fusing belt and the pressing member in contact therewith. Because such a lubricant gradually decreases with use, the friction coefficient characteristics change according to the present or absence of the lubricant, and in the fusing belt having the blackened layer on the inner surface, the friction characteristics change with use regardless of the size of the blackened crystal. On the other hand, it may be seen that the fusing belt having the sliding layer present on the inner surface thereof maintains a low friction coefficient regardless of the presence or absence of the lubricant, and thus has excellent life characteristics compared to the fusing belt having the blackened layer.

Accordingly, in order to find out which material would form the sliding layer of the best performance, sliding layers were formed of various materials to evaluate the amount of abrasion. The results are illustrated in Tables 5 and 6.

Table 5 shows the results of the experiment based on the samples obtained as follows; Preparing solutions by dispersing various lubricating resistance organic particles for improving slidability in the polyimide precursor solution; applying the prepared solutions on SUS substrates; and then performing heat treatment. Sliding layers are coated on the SUS substrates by the adhesive force of the polyimide as they are formed by the heat treatment. Because the coating is performed by the adhesion of the polyimide, there is no adhesive layer between the coating and the SUS substrate. The polyimide is PI, and PFA and PEEK represent perfluoroalkoxy fluorine resin (PFA) particles and polyetheretherketone (PEEK) particles dispersed in the polyimide, respectively.

TABLE 3

| Sample | Maximum Load (Kgf) | Minimum Load (Kgf) | Average Load (Kgf) | Maximum Friction Coefficient | Minimum Friction coefficient | Average Friction coefficient |
|---|---|---|---|---|---|---|
| Blackened Crystal Size Large | 1.22 | 1.09 | 1.15 | 0.24 | 0.22 | 0.23 |
| Blackened Crystal Size Middle | 1.45 | 1.29 | 1.36 | 0.29 | 0.26 | 0.27 |
| Blackened Crystal Size Small | 1.47 | 1.31 | 1.39 | 0.29 | 0.26 | 0.28 |
| Sliding Layer (PI + PEEK + PFA) | 0.91 | 0.69 | 0.81 | 0.18 | 0.14 | 0.16 |

TABLE 4

| Sample | Maximum Load (Kgf) | Minimum Load (Kgf) | Average Load (Kgf) | Maximum Friction Coefficient | Minimum Friction coefficient | Average Friction coefficient |
|---|---|---|---|---|---|---|
| Blackened Crystal Size Large | 0.91 | 0.73 | 0.81 | 0.18 | 0.15 | 0.16 |
| Blackened Crystal Size Middle | 1.46 | 1.35 | 1.41 | 0.29 | 0.27 | 0.28 |
| Blackened Crystal Size Small | 1.62 | 1.44 | 1.52 | 0.32 | 0.29 | 0.30 |
| Sliding Layer (PI + PEEK + PFA) | 0.92 | 0.58 | 0.72 | 0.19 | 0.12 | 0.15 |

For example, Table 5 shows the results of measuring the relative abrasivity of each material after coating PI+carbon, PI+PFA, and PI+PEEK+PFA on the SUSS. Table 5 shows the results of measuring abrasion from a change in a coating thickness by fixing a sample B, which is SUS coated with PI+carbon, SUS coated with PI+PFA, or SUS coated with PI+PEEK+PFA, and providing a sample A as a counterpart of the sample B, which is SUS coated with PI+carbon, SUS coated with PI+PFA, or SUS coated with PI+PEEK+PFA, to the sample B with a load of 2 Kg and rotating the sample A at a rotational speed of 200 rpm. At this time, the lubricant was applied between the sample A and the sample B, the sample A was heated to 180° C., and the amount of abrasion was compared by measuring the amount of change in thickness after 2000 sec after the start of rotation.

As may be seen in Table 5, in the case of coating PI+PFA or PI+Carbon, the amount of abrasion is relatively large, and in the case of coating PI+PEEK+PFA, it may be seen that the amount of abrasion is relatively small. Among them, the smallest amount of abrasion is a case in which both the sample A and the sample B are coated with PI+PEEK+PFA. According to the result of Table 5, it is judged that it is advantageous in abrasion to coat the inner surface of the fusing belt and the pressing member with the same material, which is PI+PEEK+PFA.

Table 6 shows the results of measuring abrasion of a sliding layer (PI+PEEK+PFA) bonded to the substrate by the PI without an adhesive layer and a sliding layer bonded through the adhesive layer. The results of measuring abrasion were obtained in the same manner as in the experiments in Table 5. For example, the abrasion was measured from a change in a coating thickness by fixing a sample B, and providing a sample A as a counterpart of the sample B, to the sample B, with a load of 2 Kg and rotating the sample A at a rotational speed of 200 rpm. At this time, the lubricant was not applied between the sample A and the sample B, the sample A was heated to 180° C., and the amount of abrasion was compared by measuring the amount of change in thickness after 2000 sec after the start of rotation.

As may be seen from Table 6, when the adhesive layer is present, the amount of abrasion is very small compared to the case in which the sliding layer is formed on the inner surface of the fusing belt and the surface of the pressing member by PI without the adhesive layer. In the case of using the adhesive layer, because there is no PI component in the sliding layer and instead there are many PEEK+PFA components having relatively good slidability, it is judged that the amount of abrasion is low. In addition, it may be seen that the use of the adhesive layer is excellent in abrasion even without the lubricant. As such, it is judged to be the most advantageous in abrasion to provide the adhesive layer on the inner surface of the fusing belt and the surface of the pressing member and to form the sliding layer (PEEK or PEEK+PFA) on the inner surface of the fusing belt and the surface of the pressing member in the same manner. Because perfluoroalkoxy fluorine resin (PFA) and polytetrafluoroethylene (PTFE) are similar substances, it was confirmed that the performance was excellent in the amount of abrasion without the lubricant even when PFA was replaced with PTFE and the sliding layer is a PEEK+PTEE layer.

TABLE 5

| No. | Sample A | Sample B | Presence or Absence of Adhesive Layer | Presence or Absence of Lubricant | Amount of Abrasion(μm) Sample A | Sample B |
|---|---|---|---|---|---|---|
| 1 | PI + carbon | PI + carbon | Absence | Presence | 0.4 | 2.3 |
| 2 | PI + PFA | PI + carbon | Absence | Presence | 1.4 | 1.9 |
| 3 | PI + PFA | PI + PEEK + PFA | Absence | Presence | 0.8 | 1 |
| 4 | PI + carbon | PI + PEEK + PFA | Absence | Presence | 0.6 | 2.1 |
| 5 | SUS | PI + PEEK + PFA | Absence | Presence | 0.8 | 0.8 |
| 6 | PI + PEEK + PFA | PI + PEEK + PFA | Absence | Presence | 0.8 | 0.5 |

The amount of abrasion caused by the friction between the pressing member present in the fusing belt and the inner surface of the fusing belt has a significant effect on the performance of the fusing apparatus. In addition, the adhesion of the sliding layer coated on the inner surface of the fusing belt and the surface of the pressing member to improve slidability is also very important. As the adhesion between the fusing belt and the sliding layer on the inner surface thereof and the adhesion between the pressing member and the sliding layer are stronger, the flow of the sliding layer during rotation is prevented, thereby causing less abrasion.

TABLE 6

| No. | Sample A | Sample B | Presence or Absence of Adhesive Layer | Presence or Absence of Lubricant | Amount of Abrasion(μm) Sample A | Sample B |
|---|---|---|---|---|---|---|
| 1 | PI + PEEK + PFA | PI + PEEK + PFA | Absence | Absence | 3.8 | 5.8 |
| 2 | PEEK | PEEK | Presence | Absence | 0.8 | 0.8 |
| 3 | PEEK + PFA | PEEK + PFA | Presence | Absence | 0.9 | 0.6 |

A comparative experiment was also performed for a case in which the sliding layer was formed by using the adhesive to minimize the amount of abrasion.

Figure 8:
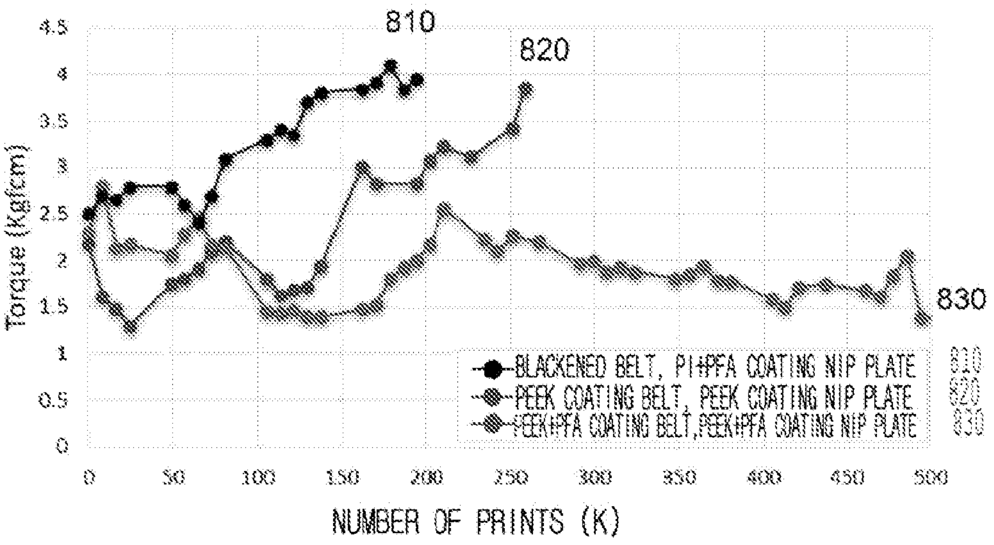
FIG. 8 is a view for describing a change in torque according to the number of prints of fusing apparatuses according to diverse examples.

FIG. 8 illustrates a change in torque according to the number of prints of a fusing apparatus comprising a fusing belt having a blackened layer on an inner surface and a pressing member having a PI+PFA sliding layer on a surface without an adhesive layer 810; a fusing apparatus comprising a fusing belt having a PEEK sliding layer on an inner surface with an adhesive layer, and a pressing member having a PEEK sliding layer on a surface with an adhesive layer 820; and a fusing apparatus comprising a fusing belt having a PEEK+PFA sliding layer on an inner surface with an adhesive layer and a pressing member having a PEEK+PFA sliding layer on a surface with an adhesive layer 830.

Referring to FIG. 8, in the fusing apparatus comprising the fusing belt having the blackened layer on the inner surface and the pressing member having the PI+PFA sliding layer on the surface without the adhesive layer, because the torque sharply increases after 70K, it may be seen that the PI+PFA sliding layer on the pressing member or the blackened layer in the fusing belt is worn, which lowers the performance of the lubricant and increases the torque 810. In the fusing apparatus comprising the fusing belt having the PEEK sliding layer on the inner surface with the adhesive layer, and the pressing member having the PEEK sliding layer on the surface with the adhesive layer, because the torque sharply increases after 150K, it may be seen that the PEEK sliding layer on the pressing member or the PEEK sliding layer on the inner surface of the fusing belt is worn, which lowers the performance of the lubricant and increases the torque 820. On the other hand, in the fusing apparatus comprising the fusing belt having the PEEK+PFA sliding layer on the inner surface with the adhesive layer and the pressing member having the PEEK+PFA sliding layer on the surface with the adhesive layer, it may be seen that the fusing apparatus is stably driven without increasing the torque even with an increase in the number of prints 830. As a result, it may be seen that the fusing apparatus comprising the fusing belt having the PEEK+PFA sliding layer on the inner surface with the adhesive layer and the pressing member having the PEEK+PFA sliding layer on the surface with the adhesive layer is stable and has good lifespan. Because perfluoroalkoxy fluorine resin (PFA) and polytetrafluoroethylene (PTFE) are similar substances, it was confirmed that the performance was excellent even when PFA was replaced with PTFE and the sliding layer is a PEEK+PTEE layer.

Although the examples of the disclosure have been illustrated and described hereinabove, the disclosure is not limited thereto, but may be variously modified and altered by those skilled in the art to which the disclosure pertains without departing from the spirit and scope of the disclosure claimed in the claims. These modifications and alterations are to fall within the scope of the disclosure.

What is claimed is:

1. A fusing apparatus comprising:

a pressing roller to be axially rotated;

a fusing belt to rotate by receiving a rotational force from the pressing roller;

a heating element to heat the fusing belt;

a pressing member to press toward the pressing roller from the inside of the fusing belt to form a nip in which printing paper is nipped between the fusing belt and the pressing roller a sliding layer, on the fusing belt or the pressing member, to reduce friction between the fusing belt and the pressing member, wherein the sliding layer is formed on an inner surface of the fusing belt or a surface of the pressing member, wherein the sliding layer comprises abrasion resistant resin particles including polyetheretherketone (PEEK) and perfluoroalkoxy fluorine resin (PFA) or polytetrafluoroethylene (PTFE), and wherein in the sliding layer, the content of PFA or PTFE is 0 to 50 wt %; and an adhesive layer, on the fusing belt or the pressing member, to adhere the sliding layer to the fusing belt or the pressing member.

2. The fusing apparatus as claimed in claim 1, wherein the abrasion resistant resin particles are sprayed on the adhesive layer and then heat treated.

3. The fusing apparatus as claimed in claim 1, wherein the sliding layer is on a surface of the pressing member and on an inner surface of the fusing belt, and the sliding layer on the surface of the pressing member and on the inner surface of the fusing belt are of the same material as each other.

4. The fusing apparatus as claimed in claim 1, wherein a blackened layer is coated on an inner surface of the fusing belt, and the sliding layer is formed on the blackened layer.

5. The fusing apparatus as claimed in claim 4, wherein the blackened layer is $Fe_4O_3$.

6. The fusing apparatus as claimed in claim 1, wherein a lubricant is not present between the fusing belt and the pressing member.

7. The fusing apparatus as claimed in claim 1, wherein the heating element is inside of the fusing belt.

8. The fusing apparatus as claimed in claim 1, wherein the sliding layer has a thickness of 1 to 50 μm.

9. The fusing apparatus as claimed in claim 1, wherein the adhesive layer has a thickness of 1 to 20 μm.

10. An image forming apparatus comprising:

a photosensitive member;

a developing apparatus to form an image on the photosensitive member;

a transfer apparatus to transfer the image to a printing paper; and a fusing apparatus to fuse the image transferred to the printing paper, the fusing apparatus including:

a pressing roller to be axially rotated;

a fusing belt to rotate by receiving a rotational force from the pressing roller;

a heating element to heat the fusing belt; and a pressing member to press toward the pressing roller from the inside of the fusing belt to form a nip in which the printing paper is nipped between the fusing belt and the pressing roller;

on the fusing belt or the pressing member, a sliding layer to reduce friction between the fusing belt and the pressing member, wherein the sliding layer is formed on an inner surface of the fusing belt or a surface of the pressing member, wherein the sliding layer comprises abrasion resistant resin particles including polyetheretherketone (PEEK) and perfluoroalkoxy fluorine resin (PFA) or polytetrafluoroethylene (PTFE), and wherein in the sliding layer, the content of PFA or PTFE is 0 to 50 wt %; and an adhesive layer to adhere the sliding ayer to the fusing belt or the pressing member.

11. The image forming apparatus as claimed in claim 10, wherein the abrasion resistant resin particles are sprayed on the adhesive layer and then heat treated.

12. The image forming apparatus as claimed in claim 1, further comprising a metal bracket to press the pressing member toward the pressing roller, wherein the metal bracket is between the heating element and the pressing member.

13. The image forming apparatus as claimed in claim 10, further comprising a metal bracket to press the pressing member toward the pressing roller, wherein the metal bracket is between the heating element and the pressing member.

14. The fusing apparatus as claimed in claim 10, wherein the sliding layer is on a surface of the pressing member and on an inner surface of the fusing belt, and the sliding layer on the surface of the pressing member and on the inner surface of the fusing belt are of the same material as each other.

15. The fusing apparatus as claimed in claim 10, wherein a blackened layer is coated on an inner surface of the fusing belt, and the sliding layer is formed on the blackened layer.

16. A fusing apparatus comprising:

a pressing roller to be axially rotated;

a fusing belt to rotate by receiving a rotational force from the pressing roller;

a heating element to heat the fusing belt;

a pressing member to press toward the pressing roller from the inside of the fusing belt to form a nip in which printing paper is nipped between the fusing belt and the pressing roller;

a sliding layer on a surface of the pressing member, the sliding layer to reduce friction between the fusing belt and the pressing member, wherein the sliding layer comprises abrasion resistant resin particles including polyetheretherketone (PEEK) and perfluoroalkoxy fluorine resin (PFA) or polytetrafluoroethylene (PTFE); and an adhesive layer, on the fusing belt or the pressing member, to adhere the sliding layer to the fusing belt or the pressing member.

* * * * *